United States Patent [19]

Robert

[11] Patent Number: 4,628,308
[45] Date of Patent: Dec. 9, 1986

[54] COMMUNICATION NETWORK HAVING A MASTER-SLAVE TYPE SERIES ARCHITECTURE AND PROVIDING MASTER-TO-SLAVE AND SLAVE-TO-MASTER COMMUNICATION

[75] Inventor: Serge Robert, Jouy en Josas, France

[73] Assignee: U.S. Philips Corporation, New York, N.Y.

[21] Appl. No.: 680,453

[22] Filed: Dec. 11, 1984

[30] Foreign Application Priority Data

Dec. 21, 1983 [FR] France ................................ 83 20481

[51] Int. Cl.$^4$ ............................................. H04Q 9/00
[52] U.S. Cl. ................................. 340/825.43; 370/85;
340/825.08; 340/825.59; 375/36
[58] Field of Search ........... 340/825.43, 825.5, 825.08,
340/825.59; 370/85, 32; 375/36

[56] References Cited

U.S. PATENT DOCUMENTS 3,657,478 4/1972 Andrews, Jr. ......................... 375/36
3,744,051 7/1973 Sanders et al. ....................... 375/36
4,546,351 10/1985 Nambu ............................ 340/825.08
4,550,306 10/1985 Kimura ................................. 375/36

OTHER PUBLICATIONS

"Ultra-Low-Cost Network for Personal Computers", K. Clements et al., BYTE Publications Inc., Oct. 1981, pp. 50-58 (59/60/61) and 62, 64; 66.

Primary Examiner—Donald J. Yusko
Attorney, Agent, or Firm—Thomas A. Briody; Jack Oisher; William J. Streeter

[57] ABSTRACT

A network having a series architecture and comprising an electronic master device (M) and a plurality of electronic slave devices ($E_1$, $E_2$, ...). Each electronic slave device is provided with an associated connection device (30) which enables the electronic slave device to be connected to a common communication channel (2) which interconnects the electronic slave devices and the master device. The common communication channel passes through the connection devices in order to preclude the occurrence of conflicting voltages when one of the electronic slave devices attempts to carry out a transmission to the electronic master device. For this purpose each connection device is equipped with a dedicated-line receiver and a dedicated-line transmitter in cascade, and an open-collector driver connecting the transmission part of the corresponding slave device to the input of the transmitter.

4 Claims, 4 Drawing Figures

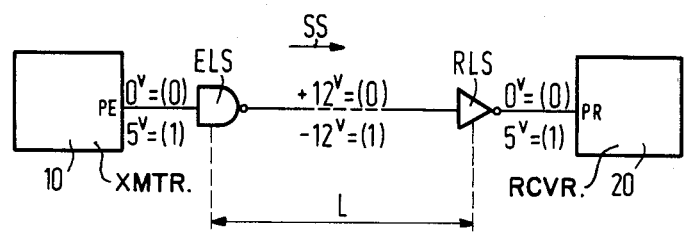
FIG.1
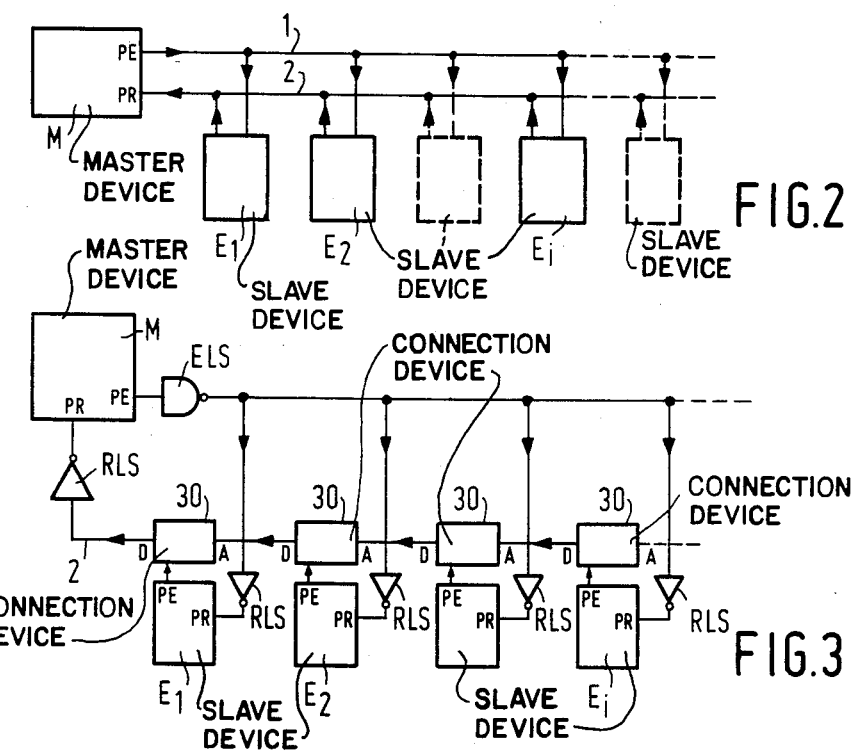
FIG.2
FIG.3
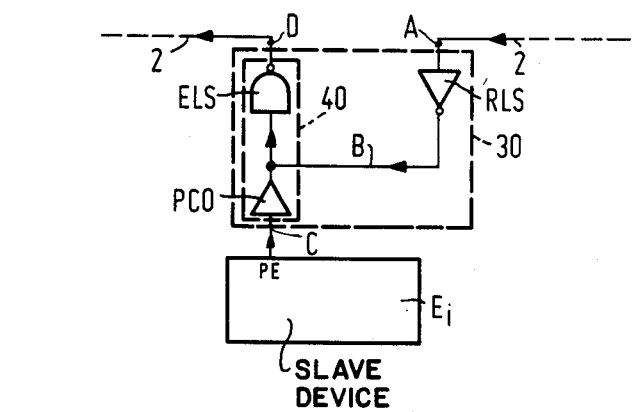
FIG.4

COMMUNICATION NETWORK HAVING A MASTER-SLAVE TYPE SERIES ARCHITECTURE AND PROVIDING MASTER-TO-SLAVE AND SLAVE-TO-MASTER COMMUNICATION

BACKGROUND OF THE INVENTION

The invention relates to a communication network having a series architecture and comprising an electronic master device and a plurality of electronic slave devices interconnected by a common communication channel which terminates at a receiving port of the electronic master device, which common communication channel includes a first dedicated-line receiver upstream of the receiving port of the electronic master device to effect a voltage-level conversion in order to derive a relatively small voltage-level swing from a relatively large voltage-level swing applied to its input and apply said relatively small voltage-level swing to said receiving port of the electronic master device, each electronic slave device being provided with an associated connection device having a first input connected to a transmitting port of the relevant electronic slave device and an output connected to the common communication channel, which connection device is adapted to effect a voltage-level conversion from a relatively small voltage-level swing to a relatively large voltage-level swing.

Such communication networks are known and operate in accordance with well-defined standards such as European standard V 28 or United States Standard RS-232. The communication channel, which interconnects the various electronic devices, is unidirectional, i.e. it connects an electronic transmitting device to an electronic receiving device. It is obvious that satisfactory communication between two electronic devices may require the use of a plurality of connections in each direction and therefore it is customary to provide as many communication channels as necessary, each of the two electronic devices thus connected operating either as a transmitter or as a receiver for each channel.

It is also known to employ the master-slave architecture for a plurality of electronic devices, the electronic master device being capable of communicating with all the slaves but the slaves not being capable of communicating with each other.

When the slaves are remote from the master, their distance may be such that voltage-level conversions are necessary; in that case a star architecture could be employed, which presents no new technological problems, in contradistinction to a series architecture.

Indeed, the series architecture requires two types of connection, a first type enabling the electronic master device to operate as a transmitter for a plurality of electronic slave receiving devices and a second type enabling the electronic master device to function as a receiver for a plurality of possible electronic slave transmitting devices; the first type does not present any specific problems, in contradistinction to the second type. The receiving port of the electronic master device may operate at a voltage-level swing, of, for example 0.5 V (0 V=logic "0" level and 5 V=logic "1" level), whereas the distance between the various electronic devices may necessitate derivation of this voltage-level swing from a voltage-level swing of a higher absolute value, for example 12 V (="0") and −12 V (="1"). The required conversion may be effected by a dedicated-line receiver (for example that available under the type number 1489), the higher value voltage-level swing being applied to the communication channel by the outputs of the various connection devices. In such a case, the connection devices may themselves effect voltage-level swing conversion, this time from the lower voltage-level swing to the higher voltage-level swing, thereby enabling the transmitting port to operate at the higher voltage-level swing.

If the communication channel is in the form of a common line thereof in the rest condition, this common line may be, for example, at −12 V but during a transmission, the electronic slave transmitting device will attempt to pull the common line to +12 V by means of its connection device. This will give rise to an electrical short circuit with the other electronic slave devices which are not transmitting and which consequently maintain the common line at −12 V.

SUMMARY OF THE INVENTION

It is an object of the invention to mitigate the abovementioned drawbacks.

According to the invention a communication network is characterized in that each connection device which is associated with a slave device other than the first in the series, has a second input and includes, in series with said second input, a further dedicated-line receiver for carrying out a voltage-level conversion from a relatively large voltage-level swing to a relatively small voltage-level swing, each further dedicated-line receiver being included in said common communication channel, which also includes a connection from the input of each further dedicated-line receiver to the output of the connection device associated with the immediately preceding slave device of the series.

By the use of a further dedicated-line receiver which forms part of the associated connection device, each electronic slave device can, in effect be isolated from the voltage-level swing carried by the major part of the common communication channel. Moreover, owing to the fact that the communication channel now includes the further dedicated-line receivers, a short circuit in the zone which operates at the higher value voltage-level swing during an attempt to transmit can be prevented; the possibility of a short-circuit can be restricted to the zone where the lower value voltage level swing obtains.

It should be noted that another means of solving the problem of short-circuits has been proposed in the article entitled "Ultra Low Cost Network for Personal Computer", or ULCNET, published in the magazine "BYTE", October 1981, pages 50 and 52, but the solution proposed therein requires the addition of a 2 K resistor at the end of each line and a power supply of −12 V, as well as the addition of a diode type 1N4933 for each transmitter. Moreover, this network is not a communication network comprising an electronic master device and a plurality of electronic slave devices.

Preferably the network is further characterized in that each of said connection devices comprises a dedicated-line transmitter, the output of which constitutes the output of the corresponding connection device, which transmitter is adapted to effect the voltage-level conversion from a relatively small voltage-level swing to a relatively large voltage-level swing in the corresponding connection device, an open-collector driver circuit, coupling the transmitting port of the corresponding slave device to an input of said dedicated-line transmitter, and the corresponding dedicated-line receiver coupling the second input of the connection device to an input of said dedicated-line transmitter. The provision of an open-collector driver ensures that the voltage appearing on the output of the dedicated line receiver cannot be in conflict with the voltage level appearing on the transmitting port of the associated electronic slave device.

DESCRIPTION OF THE DRAWINGS

An embodiment of the invention will now be described in detail, by way of example, with reference to the accompanying diagrammatic drawings, in which:

FIG. 1, by way of illustration, shows a type V 28 connection;

FIG. 2 represents schematically an example of a master-slave architecture;

FIG. 3 shows the embodiment; and

FIG. 4 shows a possible construction for a connection device forming part of the embodiment of FIG. 3.

DESCRIPTION OF THE PREFERRED EMBODIMENT

FIG. 1 shows a known arrangement in conformity with European standard V 28, which is equivalent to United States Standard RS 232.

An electronic transmitting device (10) is connected to an electronic receiving device (20). The arrow (SS) indicates the direction of travel of the signal from the transmitting port (PE) to the receiving port (PR). These ports operate at a relatively low voltage-level swing of 0/5 V, i.e. 0 V (=logic "0" level) and 5 V (=logic "1" level) depending on the conventions adopted. When the distance (L), which physically separates the two elecronic devices (10) and (20), is larger than about fifteen meters, the low voltage-level swing of 0/5 V is no longer adequate for transferring the signal and it is technologically necessary to employ a higher voltage-level swing, for example +12 V (=logic "0" level) and −12 V (=logic "1" level) in conformity with the V 28 standard. This change in voltage-level swing is accomplished by means of commercially available devices, for example, a dedicated-line transmitter (ELS) type 1488 and a dedicated-line receiver (RLS) type 1489, which are available, for example, from Signetics.

An arrangement as shown in FIG. 1 is unidirectional and in order to enable satisfactory communication between two electronic devices to be obtained, several connections in each direction are often required. Since each such connection will be electrically independent of the other connections, it is appropriate to describe only one connection.

FIG. 2 shows an example of a communication network having a series architecture and comprising an electronic master device (M) which communicates with a plurality of electronic slave devices ($E_1$, $E_2$, ... $E_i$, ...). The electronic slave devices cannot communicate with one another, so that all cases that are possible can be illustrated by two types of connection, namely: a type (1) connection when the electronic master device (M) operates as a transmitter via a transmitting port (PE) and a type (2) connection when the electronic master device (M) operates as a receiver via a receiving port (PR); each electronic slave device functions as a receiver in the type (1) connection and a transmitter for the type (2) connection; the electronic slave devices transmit, simultaneously or non-simultaneously, to the electronic master device over the same line (2).

If the distance between the electronic master device and the various electronic slave devices demands the use of a V 28-type connection as described above, the transmitting port of the master must be equipped with a dedicated device, for example that available under the type number 1488, and the receiving ports of the various slaves must each be equipped with a dedicated device, for example, that available under the type number 1489, as mentioned above, to provide for the case that the electronic master device operates as a transmitter.

Type (1) connections present no specific technological problems.

However, problems are liable to arise if, in the case of a type (2) connection (when the electronic slave device operates as a transmitter and the electronic master device as a receiver), the receiving port of the electronic master device is equipped with a dedicated device type 1489 and the transmitting port of each electronic slave device is equipped with a dedicated device type 1488. In such a case, all the dedicated-line transmitters connected to the transmitting ports of the electronic slave devices pull the line to −12 V in the rest condition so that a short circuit occurs as soon as one of the electronic slave devices attempts to transmit and thus pull the line to +12 V.

This problem can be eliminated if the communication network as shown in FIG. 3 is employed. Each electronic slave device, with the possible exception of the first of the series (not shown), is provided with an associated connection device 30 having a first input connected to the transmitting port (PE) of the relevant electronic slave device. The type (2) connection now passes through each connection device 30 via a terminal (D) for outgoing signals towards the electronic master device and a terminal (A) for incoming signals from the opposite direction. Communication between the various connection devices is effected using the voltage levels +12 V and −12 V in conformity with the V 28 standard.

FIG. 4 shows a possible construction for a connection device 30 in more detail. This connection device 30 comprises a conventional dedicated-line transmitter (ELS), for example, that available under the type number 1488, which now forms part of a gate circuit 40, and a dedicated-line receiver (RLS), for example, that available under the type number 1489, whose input is connected to the abovementioned incoming terminal (A) and whose output is connected to the input of the dedicated-line transmitter (ELS) via the connection (B). The gate circuit 40 also comprises an open-collector circuit (PCO), for example, a buffer/driver type 7417 which is commercially available from Signetics, interposed between the transmitting port (PE) of the corresponding electronic slave device ($E_i$) and the input of the dedicated-line transmitter (ELS).

It will be appreciated that, as an alternative, the open-collector driver circuit (PCO) may form part of the electronic slave device, in which case it is no longer necessary to provide the gate circuit 40 with such an open-collector driver. Furthermore, the dedicated-line transmitter (ELS) may be provided with two separate inputs, one being connected to the output of the dedicated-line receiver (RLS) and the other to the output of the open-collector driver (or to the transmitting port).

The connection device 30 may be integrated together with the electronic slave device on a common semiconductor body. The incoming terminal (a) and the outgoing terminal (d) will then correspond to an input and an output, respectively, of the semiconductor body to which the respective ends of the type (2) connection are connected.

The connection device 30 operates in conformity with the table given below in which the voltages (V) and the corresponding levels (S="1" or "0") on each of the points (A, B, C, D) indicated in the connection device shown in FIG. 4, are given for the various cases (I, II, III).

If all the electronic slave devices are connected as is shown in FIGS. 3 and 4, it is obvious that if the electronic slave device $E_1$ in FIG. 3 transmits, this will not affect the other electronic slave devices $E_i(i>1)$. If the electronic slave device $E_2$ transmits, its message will pass through the connection device associated with the electronic slave device $E_1$ but not through those associated with the devices $E_i$ for which $i>2$, etc. In the following analysis, the possible states of an arbitrary electronic slave device $E_i$ are given in combination with the possible states of the line 2 at its incoming end (A), the latter corresponding to whether another electronic slave device $E_{i+n}(n>0)$ connected to the line 2 at a greater distance from the electronic master device (M) than the electronic slave device $E_i$ transmits or does not transmit.

Three cases may be distinguished:

Case I

This is the rest state in which there is no transmission from $E_i$ or from $E_{i+n}$; point (A) is then at $-12$ V $(=1)$ and point (C) at 5 V $(=1)$, so that point (B) is at 5 V $(=1)$ and point (D) is at $-12$ V $(=1)$; no conflict is possible.

Case II

This situation occurs when $E_{i+n}$ transmits and $E_i$ does not transmit; point (A) is then at $+12$ V $(=0)$ and point (C) at 5 V $(=1)$, so that point (B) is at 0 V $(=0)$ and point (D) at $+12$ V $(=0)$; there is no conflict owing to the presence of the open-collector driver circuit (PCO) between the points (B) and (C).

Case III

This situation occurs when $E_{i+n}$ does not transmit and $E_i$ transmits; point (A) is then at $-12$ V $(=1)$ and point (C) at 0 V $(=0)$, so that point (B) is at 0 V $(=0)$ and point (D) at $+12$ V $(=0)$; the presence of the dedicated-line receiver (RLS) precludes a possible conflict between the points (A) and (B).

|     | A        |          | C        |          | B        |          | D        |          |
|-----|----------|----------|----------|----------|----------|----------|----------|----------|
|     | V volts  | S 0/1    | V volts  | S 0/1    | V volts  | S 0/1    | V volts  | S 0/1    |
| I   | −12      | 1        | 5        | 1        | 5        | 1        | −12      | 1        |
| II  | +12      | 0        | 5        | 1        | 0        | 0        | +12      | 0        |
| III | −12      | 1        | 0        | 0        | 0        | 0        | +12      | 0        |

The above table shows that the connection device 30 functions as a logic AND-gate for the signals on the points A "and" (D=AC).

It will be appreciated that it is now possible to realize V28 connections in a communication network comprising a plurality of electronic devices arranged in accordance with master-slave series architecture.

It is to be noted that the network construction described enables the physical length of the master-slave connections to be substantially extended. In a standard connection as shown in FIG. 1, the length L should be smaller than approximately 1.5 km when signal regeneration is not provided. With the construction of FIGS. 3 and 4, the $n^{th}$ electronic slave device (En) can be situated at "n" times 1.5 Km from the electronic master device (M), because the transmitted signal is "restored" by the dedicated-line receivers which are included in every intermediate connection device.

What is claimed is:

1. A communication network having a series architecture and comprising an electronic master device and a plurality (N) of electronic slave devices, each electronic slave device being provided with an associated connection device having a first input connected to a transmitting port of the relevant electronic slave device and an output, each connection device which is associated with a slave device other than the first in the series has a second input, the second input of the connection device associated with a j-th $(2 \leq j \leq N)$ electronic slave device being connected via a communication channel to the output of the connection device associated with the $(j-1)$-th electronic slave device in the series, the output of the connection device associated with the N-th electronic slave device being connected to a line input of a first dedicated line receiver having a line output connected to a receiving port of the electronic master device, said first dedicated line receiver effecting a voltage-level conversion in order to derive a relatively small voltage-level swing from a relatively large voltage-level swing applied to its line input and applying said relatively small voltage-level swing to its line output, each of said connection devices comprises voltage level conversion means connected between said first input and said output, said voltage level conversion means effecting a voltage level conversion from said supplied relatively small voltage-level swing to said relatively large voltage-level swing and applying said relatively large voltage-level swing to said output, each of said connection devices having a second input comprising a second dedicated line receiver for carrying out a voltage level conversion from said relatively large voltage-level swing applied on said second input to said relatively small voltage-level swing and for applying said relatively small voltage-level swing to an input of the voltage level conversion means of the corresponding connection device.

2. A communication network as claimed in claim 1, wherein said voltage level conversion means comprises a dedicated line transmitter, a line input of which being coupled to a line output of the second dedicated line receiver, respectively, via an open collector driver circuit to the transmitting port of the corresponding electronic slave device.

3. A network as claimed in claim 1 or 2, wherein each connection device is integrated together with the corresponding slave device on a common semiconductor body.

4. A communication network as claimed in claim 1 or 2, wherein said communication network includes a connection device comprising said voltage level conversion means and said second dedicated-line receiver.

* * * * *